(12) United States Patent
Bian et al.

(10) Patent No.: US 11,091,382 B2
(45) Date of Patent: Aug. 17, 2021

(54) EARTHWORM REACTOR OF FRAME COMPOSITE STRUCTURE AND METHOD OF TREATING SLUDGE THEREBY

(71) Applicant: NANJING NORMAL UNIVERSITY, Nanjing (CN)

(72) Inventors: Bo Bian, Nanjing (CN); Xiuren Hu, Nanjing (CN); Ganpei Tian, Nanjing (CN); Tong Zhang, Nanjing (CN); Limin Zhang, Nanjing (CN)

(73) Assignee: NANJING NORMAL UNIVERSITY, Nanjing (CN)

( * ) Notice: Subject to any disclaimer, the term of this patent is extended or adjusted under 35 U.S.C. 154(b) by 0 days.

(21) Appl. No.: 16/881,439

(22) Filed: May 22, 2020

(65) Prior Publication Data
US 2020/0283322 A1 Sep. 10, 2020

(30) Foreign Application Priority Data
Oct. 18, 2019 (CN) .......................... 201910993363.2

(51) Int. Cl.
*C02F 11/02* (2006.01)
*C02F 3/32* (2006.01)

(52) U.S. Cl.
CPC .............. *C02F 11/02* (2013.01); *C02F 3/327* (2013.01); *Y02W 10/10* (2015.05)

(58) Field of Classification Search
CPC .......... C02F 11/02; C02F 3/327; Y02W 10/10
USPC ................... 210/602, 620, 150, 151; 119/6.7
See application file for complete search history.

(56) References Cited

U.S. PATENT DOCUMENTS

| | | | | |
|---|---|---|---|---|
| 3,635,816 A | * | 1/1972 | Golub ..................... | C02F 3/327 210/602 |
| 5,919,366 A | * | 7/1999 | Cameron .................. | C02F 3/04 210/602 |
| 2008/0017566 A1 | * | 1/2008 | Hill .......................... | C02F 3/04 210/295 |
| 2012/0187041 A1 | * | 7/2012 | Popa .................... | A01K 67/033 210/602 |
| 2013/0118410 A1 | * | 5/2013 | Berkson ................ | C05F 17/964 119/6.7 |

* cited by examiner

*Primary Examiner* — Fred Prince
(74) *Attorney, Agent, or Firm* — CBM Patent Consulting, LLC

(57) ABSTRACT

An earthworm reactor comprises a main body frame and multilayered reactor box bodies located in the main body frame. A bottom plate is arranged at the bottom of each layer of the main body frame, and the reactor box body is movably arranged on the bottom plate of each layer; an aerator pipe and a filtrate collecting pipe are arranged in the reactor box body of each layer; an aerating air supply pipe connected to the aerator pipe of each layer and a filtrate centralizing pipe connected to the filtrate collecting pipe of each layer are separately arranged on one side of the main body frame; the aerating air supply pipe is connected to an external aerating device and the bottom of the filtrate centralizing pipe is connected to an external liquid storage tank.

10 Claims, 2 Drawing Sheets

EARTHWORM REACTOR OF FRAME COMPOSITE STRUCTURE AND METHOD OF TREATING SLUDGE THEREBY

This application claims priority to Chinese Patent Application Ser. No. CN2019109933632 filed on 18 Oct. 2019.

TECHNICAL FIELD

The present invention relates to a sludge treatment and resource utilization method, in particular to an earthworm reactor of a frame composite structure and a method of treating sludge thereby.

BACKGROUND ART

With development of social economy and urbanization, municipal sewage treatment plants increase day by day, and accompanying sludge treatment and disposal problems become the focus of people's increasing attention. Parasitic harmful microorganisms such as various bacteria and virus exist in the sludge high in water content. Meanwhile, heavy metal compounds such as zinc, lead, cadmium and copper are also concentrated in the sludge. In addition to complexity and variability of the structure of the sludge, it is relatively troublesome to dispose the sludge. At present, sludge disposal techniques primarily applied at home and abroad include landfilling, incineration, composting and biological repair. These treatment techniques have their own unique characteristics but mostly have the problems of secondary pollution and cost constraint.

With development of techniques, a biological repair method represented by an earthworm treatment technique has become an environment-friendly and effective treatment way. By treating the sludge by means of the earthworm treatment technique, not only can various bacteria and viruses be deactivated, heavy metal compounds be passivated and cured, toxicity and harmfulness of the sludge be eliminated, and nutritional substances in the sludge be kept to the maximum extent, but also an efficient biological organic fertilizer vermicompost is obtained under complex digestion and metabolic action of earthworms. The earthworm treatment technique has relatively high economical benefit and environmental benefit. However, the conventional earthworm treatment technique often has the defects that the earthworm treatment technique is affected by temperature and climate and is large in occupied area, low in treatment efficiency, long in treatment cycle and large in labor amount, the polluting range in a sludge transportation process is easily expanded and the like, so that large-scaled application of the earthworm treatment technique is under restrictions all the time.

SUMMARY OF THE INVENTION

The present invention aims to provide the earthworm reactor of the frame composite structure by combining physical and chemical properties of the sludge, characteristics of earthworm treatment and physiological habits of earthworms to solve the problems of long earthworm treatment cycle, large occupied area, mosquito breeding, odors and the like in the prior art.

In order to solve the above technical problems, the present invention discloses the earthworm reactor of the frame composite structure. The earthworm reactor comprises a main body frame and multilayered reactor box bodies located in the main body frame; a bottom plate is arranged at the bottom of each layer of the main body frame, and the reactor box body is movably arranged on the bottom plate of each layer and can be extracted from the main body frame;

an aerator pipe and a filtrate collecting pipe are arranged in the reactor box body of each layer; an aerating air supply pipe connected to the aerator pipe of each layer and a filtrate centralizing pipe connected to the filtrate collecting pipe of each layer are separately arranged on one side of the main body frame; the aerating air supply pipe is connected to an external aerating device and the bottom of the filtrate centralizing pipe is connected to an external liquid storage tank to collect the earthworm filtrate generated in the vermicomposting.

In particular, each reactor box body comprises a main box body opened in the top, and an isolating filter layer, a sand grain supplementing layer, an earthworm inhabiting layer, a nutrient supplementing layer and a sludge treatment layer which are separately paved from bottom to top in the main box body; preferably, the aerator pipe of the reactor box body of each layer is located in the earthworm inhabiting layer, and the end of the aerator pipe located outside the main box body is connected to the aerating air supply pipe; a vent hole is formed in a pipe wall of the aerator pipe in the main box body, conditions such as temperature, humidity and oxygen content in the box body are controlled by means of aeration; and the filtrate collecting pipe of each layer is located on the bottom of the isolating filter layer.

Furthermore, baffle plates capable of sliding up and down are arranged on two sides of the sludge treatment layer of the main box body, corresponding slide rails are arranged on the inner walls of two sides of the main box body below the baffle plates, and the baffle plates slide up and down in the directions of the slide rails; the bottoms of the slide rails are sealed, and screws for fixing the baffle plates are arranged on the outer walls of two sides of the main box body; the tightened screws penetrate the outer wall of the main box body to be in contact with the baffle plates in the slide rails and fix the baffle plates; and after a treatment cycle is finished, the baffle plates are descended to finish a material taking process and the baffle plates are ascended to finish a material supplementing process.

Further, an isolating plate with holes is arranged between the nutrient supplementing layer and the sludge treatment layer, wherein the diameters of the holes are 1.5-4.5 cm and the quantity of the holes is 25-85. In the material taking process, sludge treated on the isolating plate is directly scraped and it is convenient for earthworms to move up and down as the isolating plate is provided with the holes.

In particular, the main box body is 15-25 cm high, 30-70 cm long and 20-60 cm wide;

the isolating filter layer is filled with crushed straws which are 0.5-2 cm thick; the sand grain supplementing layer is filled with fine sand grains which are 0.5-1.5 cm thick, and the fineness modulus of the fine sand grains is 2.2-1.6; the earthworm inhabiting layer is filled with vermicompost which is 5-9 cm thick; the nutrient supplementing layer is filled with decomposed cow dung and perishable garbage which are 0.5-2 cm thick; and the sludge treatment layer is used for adding to-be-treated sludge which is paved for 3-10 cm thick.

In particular, the main body frame is 100-250 cm high, 32-72 cm long and 22-62 cm wide, and is divided into 5-20 layers, each layer carrying one reactor box body and each layer being 18-30 cm high.

The present invention further provides a method of treating sludge by using the above earthworm reactor of the frame composite structure. The method comprises the following steps of:

(1) putting 1.2-4.5 kg of adult *Eisenia foetida* with a clitella in an earthworm inhabiting bed in each reactor box body, putting the reactor box body in a lucifugal condition at 18-28° C. to be cultivated for 2-7 days, and spraying water to the reactor box body every day in the period to maintain the water content of the earthworm inhabiting bed at 60-80 wt %;

(2) adding a conditioning material into sludge in a sludge storage pond and then putting a bacteria solution into the sludge storage pond to be uniformly mixed for decomposing for 12-48 hours;

(3) uniformly paving the decomposed sludge in the step (2) in the earthworm inhabiting bed of each cultivated reactor box body in the step (1);

(4) putting each reactor box body in the main body frame and successively communicating the aerating air supply pipe and the filtrate centralizing pipe; and starting aeration for sludge treatment of one cycle;

(5) after sludge in each reactor box body is fully converted into vermicompost, taking out each reactor box body, scraping and collecting sludge and surface earthworms treated in each reactor box body, and supplementing to-be-treated sludge for sludge treatment of a next cycle; and (6) separating vermicompost and product earthworms from scraped and collected treated product by a screen, wherein a part of the separated vermicompost is reused as a new conditioning material and the residual vermicompost and product earthworms are stored in a centralized manner as a product.

Furthermore, earthworm degradation is easily caused as a result of inbreeding of the earthworms in the reactor, and the method further comprises the step (7) of adding 0.1-0.35 kg of rejuvenated earthworms into each reactor box body after the sludge is treated continuously for 20 cycles, wherein the rejuvenated earthworms are added to provide foreign genes to the earthworm population in the reactor, so that the activity of the earthworm population in the reactor is kept.

In particular, in the step (2), the sludge is municipal dehydrated sludge, the water content of which is 75-90 wt %; the conditioning material is a mixture of the crushed straws and the vermicompost, the adding amount of the crushed straws is 3-7% by mass of the sludge, the vermicompost is obtained in the step (6), the water content of the vermicompost is 40-60%, the carbon nitrogen ratio (C/N) of the vermicompost is 7.5-12.5, and the adding amount of the vermicompost is 10-25% by mass of the sludge; and the bacteria solution is an earthworm filtrate collected from the filtrate centralizing pipe.

Addition of the conditioning material for adjusting the water content and porosity of the sludge and the palatability of the sludge to the earthworm is a necessary step of pre-treatment. The crushed straws can provide more attachment surfaces for movement of the earthworms, increase the oxygen content and improve the structure of the sludge, so that the earthworms eat the sludge more favorably. The substance structure of the vermicompost and the microbial population types contained in the vermicompost are favorite and most suitable for survival of the earthworms. As a result, use of part of the vermicompost as the conditioning material can improve the palatability of the sludge, shorten the adaptation time of the earthworms in contact with the sludge and reduce the damage of toxic substances to the earthworms, so that the treatment efficiency is improved and the death rate of the earthworms is reduced.

The earthworm filtrate collected in an vermicomposting process contains a lot of nutritional substances and microbial populations. By collecting the earthworm filtrate generated in the treatment process to replace a conventional inoculant for earthworm fermentation and decomposition, the speed is relatively high and the decomposed sludge is better in palatability for the earthworms. The adaptation time of the earthworms in contact with the sludge can be shortened, so that the earthworm treatment efficiency is improved, and meanwhile, the cost of the inoculant can be also saved.

In the step (3), the paving thickness of the decomposed sludge is 3-10 cm. The sludge paving thickness should not be too great or too small. Air will be blocked to reduce the oxygen content in a composting box if the sludge is paved too thick, so that the treatment efficiency is affected. Too little sludge is treated periodically if the sludge is paved too thin, so that more time is wasted to collect and supplement the sludge, and therefore, the integral treatment efficiency is reduced.

In the step (4), aeration is in an intermittent aeration mode, wherein the aeration rate is 0.03-0.15 L/Min, and aeration is stopped for 3 hours after aeration is carried out for 30 minutes. The intermittent aeration mode can reduce influence of aeration on activity of the earthworms to the maximum extent under a circumstance of supplementing oxygen in the composting box.

Beneficial Effects:

1. For the present invention, the frame composite structure is reasonable in structure, small in occupied area (only 800 $m^2$ is occupied in 100 t/d treatment scale, and the occupied area is reduced by dozens of times compared with a conventional field breeding mode) and simple to operate, and the construction cost and the treatment cost are far lower than those of other sludge treatment processes. A lot of product earthworms, high quality vermicompost organic fertilizers and earthworm filtrate are produced, and the earthworm reactor is wide in application range and good in economical benefit, environmental benefit and social benefit.

2. The method adopted by the present invention to treat the sludge is relatively short in cycle, and the sludge vermicompost cycle can be shortened to 3-5 days which are $1/5$-$1/10$ of the time needed by a conventional method of sludge vermicompost. 20 or more than 20 batches of sludge can be treated continuously by putting earthworms at one time, so that a lot of manpower and material resources are saved. At the same time, it is more convenient to collect products such as vermicompost, earthworm filtrate and product earthworms, and problems of odor diffusion and mosquito breeding in the process of treating sludge by earthworms can be also avoided effectively.

BRIEF DESCRIPTION OF THE DRAWINGS

Further detailed description is made to the present invention in combination with the drawings and specific implementation. The above advantages and/or the advantages of other aspects of the present invention will become more apparent.

Figure 1:
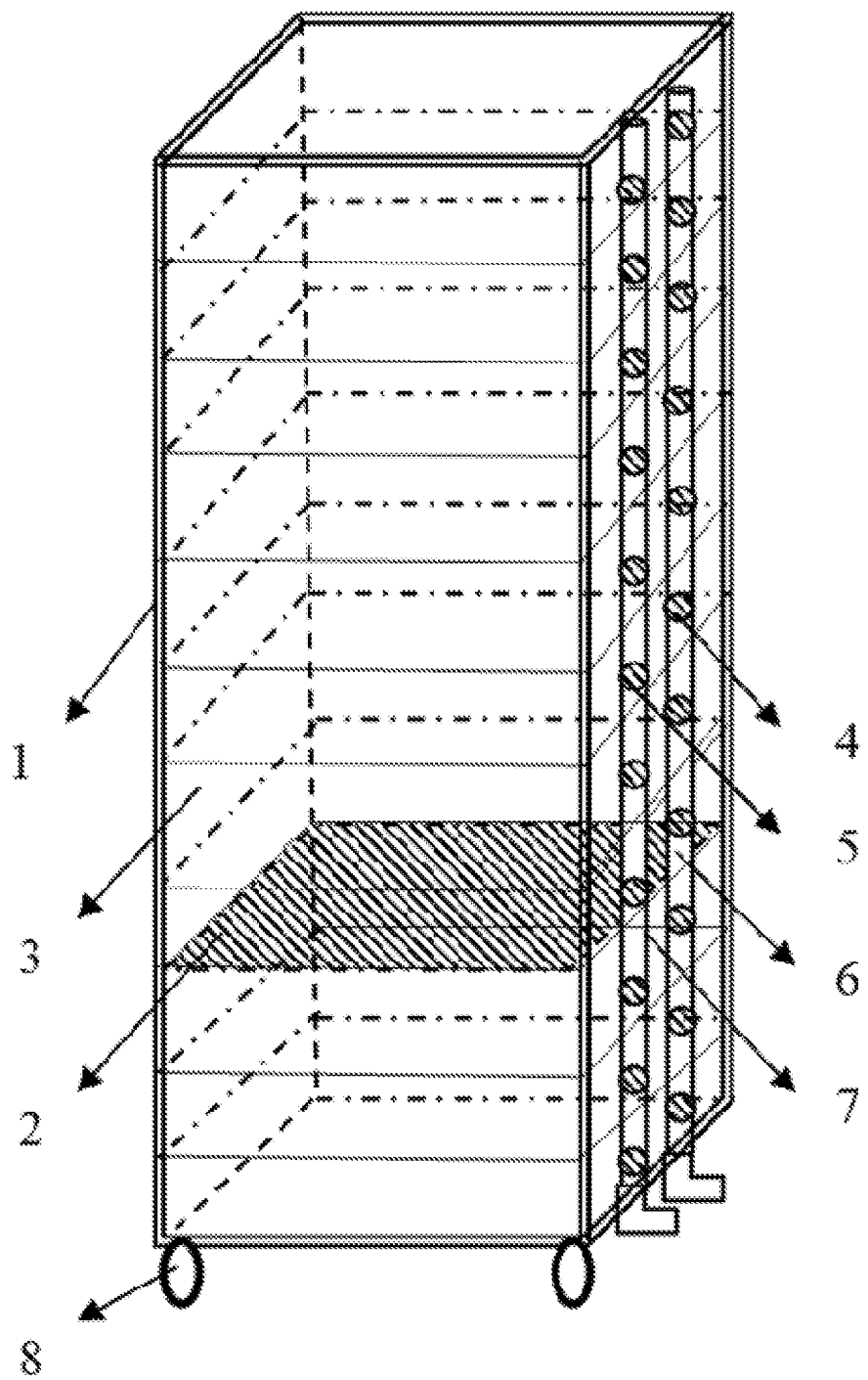
FIG. 1 is an overall structural schematic diagram of the earthworm reactor of the frame composite structure of the present invention.

Reference numerals separately represent 1 main body frame, 2 bottom plate, 3 reactor box body, 31 main box body, 32 isolating filter layer, 33 sand grain supplementing layer, 34 earthworm inhabiting layer, 35 nutrition supplementing layer, 36 sludge treatment layer, 37 baffle plate, 38 slide rail, 39 screw, 4 aerator pipe, 5 filtrate collecting pipe, 6 aerating air supply pipe, 7 filtrate centralizing pipe and 8 universal wheel.

DETAILED DESCRIPTION OF THE INVENTION

The present invention can be better understood according to the following embodiments.

Structure, proportion, size and the like shown by the drawings of the description are only used for matching with contents disclosed by the description to be understood and read by those skilled in the field rather than limiting applicable limitation conditions of the present invention. Thus, structure, proportion, size and the like do not have technical substantive meaning. Any structural modification, change of proportional relations or adjustment of size shall fall within the scope covered by the technical content disclosed by the present invention without affecting functions which can be generated and purposes which can be achieved. At the same time, terms cited in the description such as "upper", "lower", "front", "back" and "middle" are also only used for clear description rather than limiting the applicable scope of the present invention. Change or adjustment of relative relation shall also fall within the applicable scope of the present invention without altering the technical contents substantially.

Embodiment 1

In the present invention, the earthworm reactor of the frame composite structure shown in the FIG. 1 is used to treat the sludge. The earthworm reactor of the frame composite structure comprises a main body frame 1 and multi-layered reactor box bodies 3 located in the main body frame 1; a bottom plate 2 is arranged at the bottom of each layer of the main body frame 1, and universal wheels 8 are is arranged at the bottom of the main body frame 1; and the reactor box body 3 is movably arranged on the bottom plate 2 of each layer and can be extracted from the main body frame 1. The main body frame 1 is 52 cm long, 44 cm wide and 230 cm high, and totally has 15 layers, each 15 cm high. The main body frame 1 can carry 15 reactor box bodies 3 (standardized vermicomposting boxes) and the occupied area is about 0.23 m².

An aerator pipe 4 and a filtrate collecting pipe 5 are arranged in the reactor box body 3 of each layer; an aerating air supply pipe 6 connected to the aerator pipe 4 of each layer and a filtrate centralizing pipe 7 connected to the filtrate collecting pipe 5 of each layer are separately arranged on one side of the main body frame 1; the aerating air supply pipe 6 is connected to an external aerating device and the bottom of the filtrate centralizing pipe 7 is connected to an external liquid storage tank to collect the earthworm filtrate generated in the treatment process. The aerator pipe 4 of each layer is located in the earthworm inhabiting layer 34, and the end of the aerator pipe 4 located outside the main box body 31 is connected to the aerating air supply pipe 6; a vent hole is formed in a pipe wall of the aerator pipe 4 in the main box body 31, and conditions such as temperature, humidity and oxygen content in the box body are controlled by means of aeration; and the filtrate collecting pipe 5 of each layer is located on the outer wall of the bottom of the isolating filter layer 32.

Figure 2:
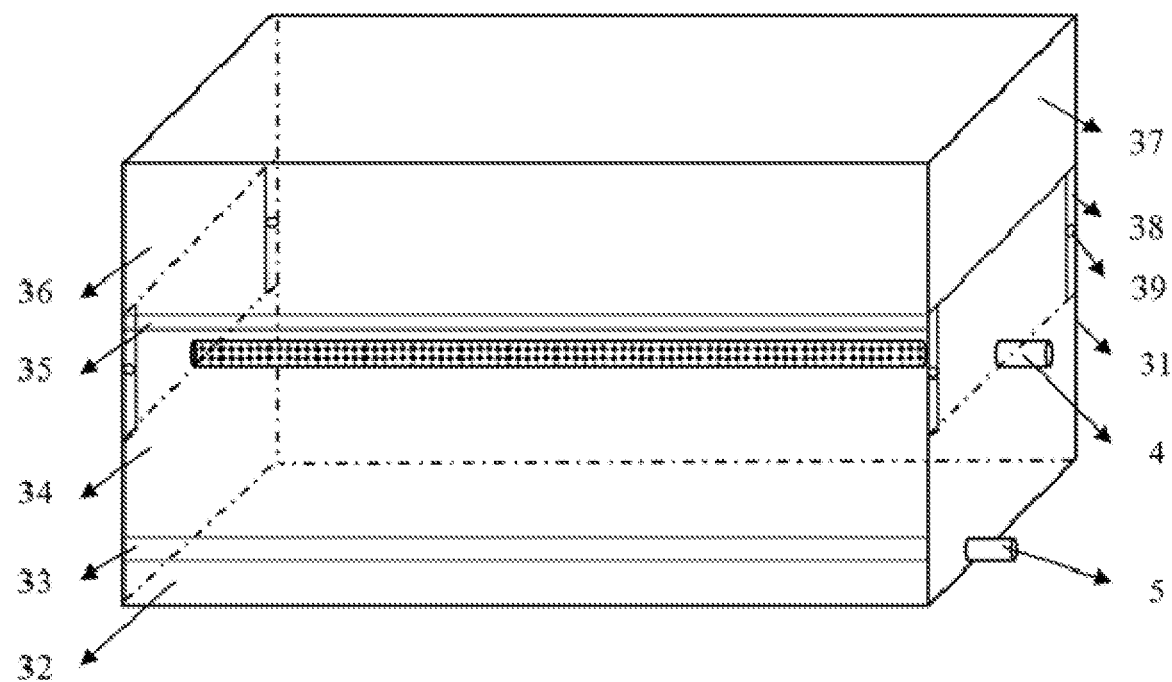
FIG. 2 is a structural schematic diagram of each reactor box body of the present invention.

As shown in the FIG. 2, each reactor box body 3 comprises a main box body 31 opened in the top, and an isolating filter layer 32, a sand grain supplementing layer 33, an earthworm inhabiting layer 34, a nutrient supplementing layer 35 and a sludge treatment layer 36 which are separately paved from bottom to top in the main box body 31. The main box body 31 is 12 cm high, 50 cm long and 40 cm wide. The isolating filter layer is filled with crushed straws which are 2 cm thick. The sand grain supplementing layer is filled with fine sand grains which are 0.5 cm thick. The earthworm inhabiting layer is filled with vermicompost which is 6 cm thick and the vermicompost is obtained by composting cow dung and straws mixture. The nutrient supplementing layer is filled with decomposed cow dung and perishable garbage which are 1 cm thick.

Baffle plates 37 capable of sliding up and down are arranged on two sides of the sludge treatment layer 36 of the main box body 31, corresponding slide rails 38 are arranged on the inner walls of two sides of the main box body 31 below the baffle plates, and the baffle plates 37 slide up and down in the directions of the slide rails 38; the bottoms of the slide rails 38 are sealed, and screws 39 for fixing the baffle plates 37 are arranged on the outer walls of two sides of the main box body 31; the tightened screws 39 penetrate the outer wall of the main box body 31 to be in contact with the baffle plates 37 in the slide rails 38 and fix the baffle plates 37; and after a treatment cycle is finished, the baffle plates are descended to finish a material taking process and the baffle plates are ascended to finish a material supplementing process. An isolating plate with holes is arranged between the nutrient supplementing layer 35 and the sludge treatment layer 36. In the material taking process, sludge treated on the isolating plate is directly scraped and it is convenient for earthworms to move up and down as the isolating plate is provided with the holes.

Treating municipal sludge somewhere by using the above earthworm reactor of the frame composite structure comprises the steps: 2 kg of adult *Eisenia foetida* with a clitella is put in the earthworm inhabiting bed in each standardized earthworm composting box, the standardized earthworm composting box is put in a lucifugal condition at 18-28° C. to be cultivated for 3 days, and water is sprayed to the surface of the earthworm inhabiting bed every day in the period to maintain the humidity. The conditioning material of the crushed straws and the vermicompost is added into the municipal sludge, the water content of which is 87%, the adding amounts of the conditioning material of the crushed straws and the vermicompost are separately 5% and 15% of to-be-treated sludge by weight, then a bacteria solution processed and prepared by an earthworm leachate is put, and the mixture is mixed uniformly for being decomposed for 24 hours. The decomposed sludge is uniformly paved on the earthworm inhabiting bed in the standardized earthworm composting box, and the sludge is paved 5 cm thick. All the standardized vermicomposting boxes are put in the main body frame and communicate to the aerating air supply pipe and the filtrate centralizing pipe, and an aeration switch is turned on for aeration for sludge treatment of one cycle. The sludge in the standardized vermicomposting boxes has been already converted into the vermicompost 4 days later, the standardized vermicomposting boxes are taken out, the baffle plates on two sides of the standardized vermicomposting boxes are descended, and the treated sludge is scraped and collected by material taking windows. After the baffle plates are ascended to add new to-be-treated sludge, the standardized vermicomposting boxes are put back in the main body frame and communicate to pipelines for sludge treatment in a next cycle. The vermicompost and the product earthworms are separated from the scraped treated sludge through a screen. The separated vermicompost is reused as a new conditioning material and the residual vermicompost and product earthworms are stored in a centralized manner as a product.

It is found by testing 7 sludge treatment cycles that the time needed by a single treatment cycle is substantially stabilized at 3-4 days under a circumstance that the sludge is paved 5 cm thick. The volume of the sludge fully converted into the vermicompost is decreased by 32.7%-40.8%. The water content is decreased from 87% to 61%, and the content of organic matters is decreased from 45.1% to 38.6%. 46.5 kg-56.3 kg of vermicompost can be collected by adding 100 kg of sludge in each cycle, the total mass of vermicompost produced in seven cycles is 47% by mass of the put sludge, 23 kg of earthworms of various sizes are collected, and 6.7 kg of adult earthworms are collected. 1.3 L of earthworm filtrate is collected.

The vermicompost obtained by this embodiment, air-dried and ground pure sludge and paddy field soil are taken as a culture medium for pot research of pakchoi. The variety of pakchoi is common *brassica chinensis* in the regions of Jiangsu and Zhejiang. It is shown by a result that compared with the paddy field soil, pure sludge will play a certain role of inhibiting growth of pakchoi and may lead to accumulation of heavy metals in pakchoi. The output of the overground part of pakchoi is increased by 132.4% by means of the vermicompost and obvious heavy metal accumulation is avoided. The vermicompost treated by earthworms in the method can be used as a culture medium for plant growth.

Embodiment 2

The used earthworm reactor of the frame composite structure is as same as that in the embodiment 1. Treating municipal sludge somewhere by using the above earthworm reactor of the frame composite structure comprises the following steps:

2 kg of adult *Eisenia foetida* with a clitella is put in the earthworm inhabiting bed in each standardized earthworm composting box, the standardized earthworm composting box is put in a lucifugal condition at 18-28° C. to be cultivated for 3 days, and water is sprayed to the surface of the earthworm inhabiting bed every day in the period to maintain the humidity. There are 4 parts of municipal sludge, the water content of which is 87%. The conditioning materials A the crushed straws and the vermicompost, B the crushed straws and the cow dung, C the crushed straws and perishable garbage and D the crushed straws and cyanobacteria are added into the municipal sludge, the adding amounts are separately 5% and 15% of to-be-treated sludge by weight, then a bacteria solution processed and prepared by an earthworm leachate is put, and the mixture is mixed uniformly for being decomposed for 24 hours. The decomposed sludge is uniformly paved on the earthworm inhabiting beds in the 4 standardized vermicomposting boxes separately, and the sludge is paved 5 cm thick. All the standardized vermicomposting boxes are put in the main body frame and communicate to the aerating air supply pipe and the filtrate centralizing pipe, and an aeration switch is turned on for aeration for sludge treatment of one cycle. The sludge in the standardized vermicomposting boxes has been already converted into the vermicompost totally, the standardized vermicomposting boxes are taken out, the baffle plates on two sides of the standardized vermicomposting boxes are descended, and the treated sludge is scraped and collected by material taking windows. After the baffle plates are ascended to add new to-be-treated sludge, the standardized vermicomposting boxes are put back in the main body frame and communicate to pipelines for sludge treatment in a next cycle.

Under a circumstance that the sludge is paved 5 cm thick, the time needed by a single treatment cycle is substantially 9-13 days by using C the crushed straws and the perishable garbage, and D the crushed straws and the cyanobacteria as the conditioning material to condition the sludge. 2 earthworm cocoons are obtained in the single standardized earthworm composting box in the single cycle, the mass of the obtained earthworms is 0.21 and the average mass is 2.58 g.

The time needed by a single treatment cycle is substantially 7-9 days by using B the crushed straws and the cow dung as the conditioning material to condition the sludge. 21 earthworm cocoons are obtained in the single standardized earthworm composting box in the single cycle, the mass of obtained earthworms is 0.17 and the average mass is 1.64 g.

The time needed by a single treatment cycle is substantially 3-4 days by using A the crushed straws and the vermicompost as the conditioning material to condition the sludge. 18 earthworm cocoons are obtained in the single standardized earthworm composting box in the single cycle, the mass of obtained earthworms is 0.36 kg and the average mass is 3.62 g.

By comparison, by taking the crushed straws and vermicompost as the conditioning material, the efficiency of treating the sludge by earthworms can be improved greatly and the treatment cycle can be shortened. Meanwhile, by taking the crushed straws and vermicompost as the conditioning material to condition the sludge, more earthworms are produced and the proportion of medium and large earthworm is greater, so that a larger economical benefit can be generated.

The present invention provides an earthworm reactor and a concept and a method thereof of resource-recovering sludge. There are many specific methods and approaches to achieve the technical scheme. The above description is only the preferred implementation of the present invention. It should be noted that several improvements and embellishments may be made within the protection range of the present invention to those skilled in the technical field without departing from the principle of the present invention. Unspecified components in the embodiments can be implemented by means of the prior art.

What is claimed is:

1. An earthworm reactor of a frame composite structure, characterized by comprising a main body frame (1) and multilayered reactor box bodies (3) located in the main body frame (1), wherein a bottom plate (2) is arranged at the bottom of each layer of the main body frame (1), and each reactor box body (3) is movably arranged on the bottom plate (2) of each layer and can be extracted from the main body frame (1);

an aerator pipe (4) and a filtrate collecting pipe (5) are arranged in the reactor box body (3) of each layer; an aerating air supply pipe (6) connected to the aerator pipe (4) of each layer and a filtrate centralizing pipe (7) connected to the filtrate collecting pipe (5) of each layer are separately arranged on one side of the main body frame (1); the aerating air supply pipe (6) is connected to an external aerating device and the bottom of the filtrate centralizing pipe (7) is connected to an external liquid storage tank.

2. The earthworm reactor of the frame composite structure according to claim 1, characterized in that the reactor box body (3) comprises a main box body (31) opened in a top, and an isolating filter layer (32), a sand grain supplementing layer (33), an earthworm inhabiting layer (34), a nutrient supplementing layer (35) and a sludge treatment layer (36) separately paved from bottom to top in the main box body (31); the aerator pipe (4) of the reactor box body of each layer is located in the earthworm inhabiting layer (34), and the end of the aerator pipe (4) located outside the main box body (31) is connected to the aerating air supply pipe (6); a vent hole is formed in a pipe wall of the aerator pipe (4) in the main box body (31); and the filtrate collecting pipe (5) of each layer is located on the outer wall of the bottom of the isolating filter layer (32).

3. The earthworm reactor of the frame composite structure according to claim 2, characterized in that baffle plates (37) capable of sliding up and down are arranged on two sides of the sludge treatment layer (36) of the main box body (31), and corresponding slide rails (38) are arranged on the inner walls of two sides of the main box body (31) below the baffle plates (37); the bottoms of the slide rails (38) are sealed, and screws (39) for fixing the baffle plates (37) are arranged on the outer walls of two sides of the main box body (31); and the tightened screws (39) penetrate the outer wall of the main box body (31) to be in contact with the baffle plates (37) in the slide rails (38) and fix the baffle plates (37).

4. The earthworm reactor of the frame composite structure according to claim 3, characterized in that an isolating plate with holes is arranged between the nutrient supplementing layer (35) and the sludge treatment layer (36), wherein the diameters of the holes are 1.5-4.5 cm and the quantity of the holes is 25-85.

5. The earthworm reactor of the frame composite structure according to claim 2, characterized in that the main box body (31) is 15-25 cm high, 30-70 cm long and 20-60 cm wide;
the isolating filter layer (32) is filled with 0.5-2 cm thick crushed straws; the sand grain supplementing layer (33) is filled with 0.5-1.5 cm thick fine sand grains, and the fineness modulus of the fine sand grains is 2.2-1.6; the earthworm inhabiting layer (34) is filled with 5-9 cm thick vermicompost; the nutrient supplementing layer (35) is filled with 0.5-2 cm thick decomposed cow dung and perishable garbage; and the sludge treatment layer (36) is used for adding to-be-treated sludge for 3-10 cm thick paving.

6. The earthworm reactor of the frame composite structure according to claim 1, characterized in that the main body frame (1) is 100-250 cm high, 32-72 cm long and 22-62 cm wide, and is divided into 5-20 layers, each layer carrying one reactor box body (3) and each layer being 18-30 cm high.

7. A method of treating sludge by using the earthworm reactor of the frame composite structure according to claim 1, characterized by comprising the following steps of:
(1) putting 1.2-4.5 kg of adult *Eisenia foetida* with a clitella in an earthworm inhabiting bed in each reactor box body (3), putting the reactor box body (3) in a lucifugal condition at 18-28° C. to be cultivated for a period of 2-7 days, and spraying water to the reactor box body (3) every day in the period to maintain a water content of the earthworm inhabiting bed at 60-80 wt %;
(2) adding a conditioning material into sludge in a sludge storage pond and then putting a bacteria solution into the sludge storage pond to be uniformly mixed for decomposing for 12-48 hours;
(3) uniformly paving the decomposed sludge in the step (2) in the earthworm inhabiting bed of each cultivated reactor box body (3) in the step (1);
(4) putting each reactor box body (3) in the main body frame (1) and successively communicating the aerating air supply pipe (6) and the filtrate centralizing pipe (7); and starting aeration for sludge treatment of one cycle;
(5) after sludge in each reactor box body (3) is fully converted into vermicompost, taking out each reactor box body (3), scraping and collecting sludge and surface earthworms treated in each reactor box body (3), and supplementing to-be-treated sludge for sludge treatment of a next cycle; and
(6) separating vermicompost and product earthworms from scraped and collected treated product by a screen, wherein a part of the separated vermicompost is reused as a new conditioning material and a residual vermicompost and product earthworms are stored in a centralized manner as a product.

8. The method of treating sludge according to claim 7, characterized by further comprising a step (7): adding 0.1-0.35 kg of rejuvenated earthworms into each reactor box body (3) after sludge is treated continuously for 20 cycles.

9. The method of treating sludge according to claim 7, characterized in that in the step (2), the sludge is municipal sludge with a water content of 75-90 wt %; the conditioning material is a mixture of crushed straws and vermicompost, the adding amount of the crushed straws is 3-7% by mass of the sludge, the vermicompost is obtained in the step (6), the water content of the vermicompost is 40-60%, a carbon nitrogen ratio of the vermicompost is 7.5-12.5, and the adding amount of the vermicompost is 8-35% by mass of the sludge; and the bacteria solution is an earthworm filtrate collected from the filtrate centralizing pipe.

10. The method of treating sludge according to claim 7, characterized in that in the step (4), aeration is in an intermittent aeration mode, wherein the aeration rate is 0.03-0.15 L/Min, and aeration is stopped at every 30 minutes for 3 hours; and one cycle of sludge treatment is 3-5 days.

\* \* \* \* \*